United States Patent [19]

Iida et al.

[11] Patent Number: 5,717,846
[45] Date of Patent: Feb. 10, 1998

[54] METHOD AND SYSTEM FOR DRAWING NETWORK DIAGRAMS

[75] Inventors: Toshiya Iida; Yasuhiro Nakada, both of Yokohama, Japan

[73] Assignee: Hitachi Software Engineering Co., Ltd., Kanagawa, Japan

[21] Appl. No.: 315,984

[22] Filed: Sep. 30, 1994

[30] Foreign Application Priority Data

Sep. 30, 1993 [JP] Japan .................. 5-268105

[51] Int. Cl.⁶ .................................. G06F 15/00
[52] U.S. Cl. .................................. 395/141
[58] Field of Search .................. 395/141, 140, 395/142, 143; 345/113, 114, 135, 136

[56] References Cited

U.S. PATENT DOCUMENTS

| | | | |
|---|---|---|---|
| 4,875,187 | 10/1989 | Smith | 364/900 |
| 4,970,664 | 11/1990 | Kaiser et al. | 364/521 |
| 5,038,294 | 8/1991 | Arakawa et al. | 364/491 |
| 5,164,908 | 11/1992 | Igarashi | 364/521 |

FOREIGN PATENT DOCUMENTS

| | | |
|---|---|---|
| 0 384 571 | 1/1990 | European Pat. Off. . |
| 3-256170 | 11/1991 | Japan . |

*Primary Examiner*—Phu K. Nguyen
*Attorney, Agent, or Firm*—Fay, Sharpe, Beall, Fagan, Minnich & McKee

[57] ABSTRACT

The positions of lines connecting nodes are selected such that the lines do not overlap nodes other than those which they are connecting. This is based on the position information of nodes within the network diagram, and connection information indicating which nodes are connected by the node-connecting lines. Node-connecting lines which are to be connected are generated in these selected positions, using straight lines or curved lines.

10 Claims, 10 Drawing Sheets

FIG. 4

| NODE NAME | LEFT UPPER COORDINATES | RIGHT LOWER COORDINATES |
|---|---|---|
| S | S1x, S1y | S2x, S2y |
| E | E1x, E1y | E2x, E2y |
| T | T1x, T1y | T2x, T2y |

FIG. 5

| LINE NUMBER | STARTING NODE | ENDING NODE | LINE ADDITIONAL INFORMATION |
|---|---|---|---|
| L1 | S | E | AAA |

METHOD AND SYSTEM FOR DRAWING NETWORK DIAGRAMS

BACKGROUND OF THE INVENTION

The present invention relates to a method and system for drawing network diagrams, such as data flow diagrams.

In general, the use of network diagrams such as data flow diagrams has become widespread for representing various types of system analysis operations, system design operations, and other general matters in an easily understandable form.

For example, data flow diagrams and entity relationship diagrams (ER diagrams) are widely used in computer system analysis operations. These network diagrams are drawn by enclosing functions or data items in figures such as ellipses or rectangles (hereinafter referred to as "nodes"), connecting the relationships between these nodes with straight lines, broken lines and curved lines (hereinafter referred to as "lines"), and entering additional data indicating the details of the relationship or the direction of the relationship in the vicinity of the lines.

Prior art methods for performing such drawings include, as disclosed in Japanese Laid-open Patent No. 3-256170, drawing the nodes by resolving them into vertical lines and horizontal lines and specifying the start points and end points of these lines as coordinates. The lines are then drawn by connecting the nodes using, for example, broken lines comprising vertical lines and horizontal lines, by specifying the coordinates of the broken lines comprising vertical lines and horizontal lines.

However, since network diagrams are widely used with the aim of representing certain matters in an easily understandable form, the node positions are often specified freely by the draftsman, depending on the meaning of the node.

However, the abovementioned prior art methods suffer from the problem that the nodes are drawn by resolving them into vertical lines and horizontal lines, and the lines connecting the nodes are also drawn by specifying the start point and end point of the line, using broken lines comprising vertical lines and horizontal lines. Thus, although there is no great problem when the number of nodes is small, as the number of nodes increases it becomes difficult to actually specify the coordinates of the line connecting the nodes so that they are in a readily understandable position. This, as a result, interrupts the train of thought of the operator. Also, it becomes even more difficult to draw the connecting lines, rendering this method inefficient.

There is also the problem that ease of understanding of the diagram is sacrificed when it is drawn by resolving it into vertical lines and horizontal lines.

Moreover, when considering the relationship between lines and nodes, the diagram is easier to understand if these two do not overlap. However, such matters have not been taken into account in the past. Therefore, diagrams are drawn with these overlaps still present or lines in the overlapping portions hidden, and as a result, the network diagram which is drawn bears little resemblance to the operator's intended depiction, and is difficult to understand.

SUMMARY OF THE INVENTION

The present invention is directed to providing a method and system for drawing network diagrams in which it is possible to draw easily understandable network diagrams efficiently.

In order to attain the above object, the method from drawing network diagrams of the present invention is characterized in that the positions of lines connecting nodes are selected such that the lines do not overlap nodes other than those which they are connecting, based on position information of the nodes within the network connection information indicating which nodes are connected by the node-connecting lines. The lines connecting the nodes which are to be connected are generated in the selected positions using straight lines or curved lines.

Also, the system according to the present invention is provided with a node information storage means which stores the position information of the nodes in the network diagram, a line logic information storage means which holds connection information indicating which nodes are connected by the node-connecting lines, and a line generation means which selects the position for the lines connecting the nodes such that the lines do not overlap nodes other than those which they connect, based on the node information and the connection information. The system then generates lines in the selected positions, connecting the nodes which are to be connected, using straight lines or curved lines.

Therefore, the positions of lines connecting nodes are selected such that the lines do not overlap nodes other than those which they connect, based on node information and connection information, and the lines connecting the nodes which are to be connected are generated in the selected positions, using straight lines or curved lines. Thus, easily understandable network diagrams can be efficiently drawn.

Also, when applied to interactive processing, the operator need only specify the nodes between which he wishes to draw a line, and it is not necessary to specify the drawing coordinates of the line or the drawing direction. The operator can thus work without interruption of his train of thought. Moreover, the resulting drawing comprises straight lines and simple curved lines, and the lines do not overlap interferences such as other nodes. Thus, an intuitive and easily understandable network diagram can be produced, and the working efficiency of the operator is greatly improved.

BRIEF DESCRIPTION OF THE DRAWINGS

FIG. 3 including

FIG. 4 is a diagram showing an example of node information.

FIG. 5 is a diagram showing an example of line logic information.

FIG. 6 including

FIG. 7 including

FIG. 9 including

DESCRIPTION OF THE PREFERRED EMBODIMENTS

An embodiment of the present invention will now be described in detail using the diagrams.

Figure 1:
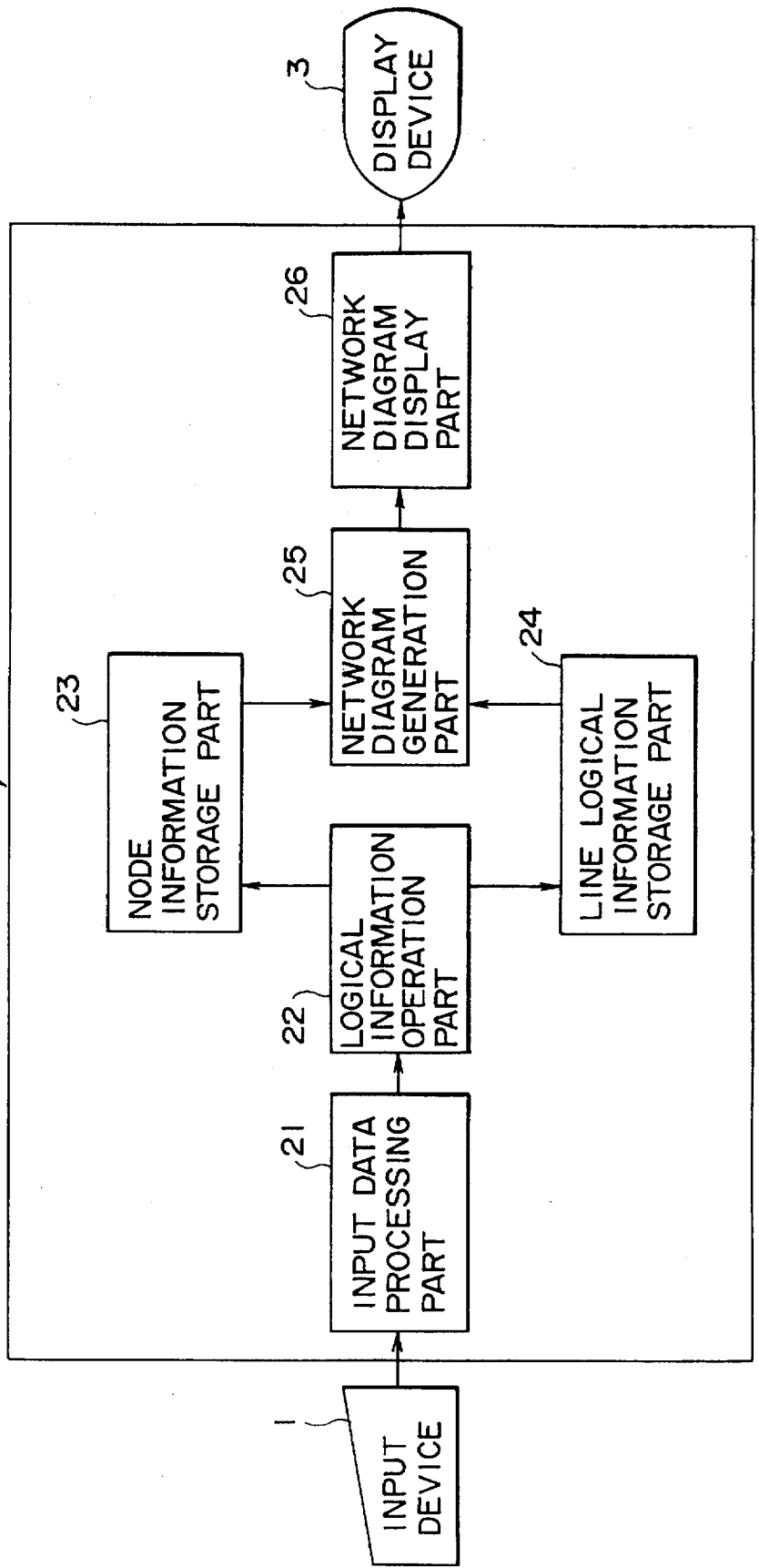
FIG. 1 is a system block diagram showing one embodiment of a data processing device to which the present invention has been applied.

FIG. 1 is a block diagram showing an embodiment of a data processing system incorporating the drawing system of the present invention, and includes an input device 1 such as a pen or mouse, a data processing device 2 and a display device 3.

The data processing device 2 includes an input data processing part 21 which analyzes the information input from the input device 1, and converts it into node information and line logic information. A logical information operation part 22 performs operations on the node information and connection information with respect to each of the information storage parts. A node information part 23 holds information relating to the nodes, such as the coordinates and properties of the nodes which have been input. A line logic information storage part 24 holds connection information and line additional information indicating logical relationships, namely which node the input line is connecting to which node. A network diagram generating part 25 generates a network diagram from the node information and the connection information. The network diagram is displayed by a network diagram display part 26.

Figure 2:
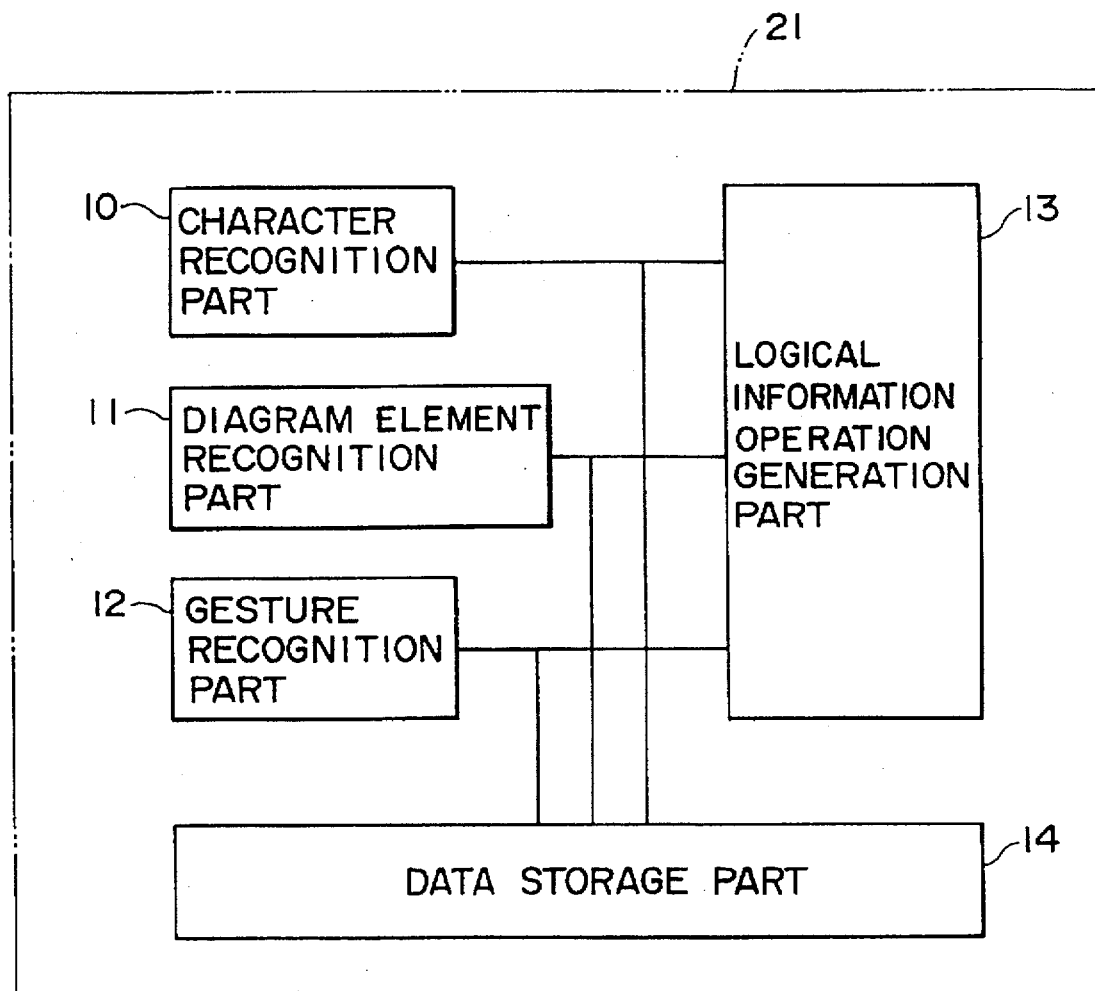
FIG. 2 is an internal block diagram of the input data processing part of FIG. 1.

FIG. 2 is a diagram showing the inside of the input data processing part 21 in more detail. The input data processing part 21 consists of a character recognition part 10, a diagram recognition part 11, a gesture recognition part 12, a logical information operation generation part 13 and a data storage part 14.

Figure 3A:
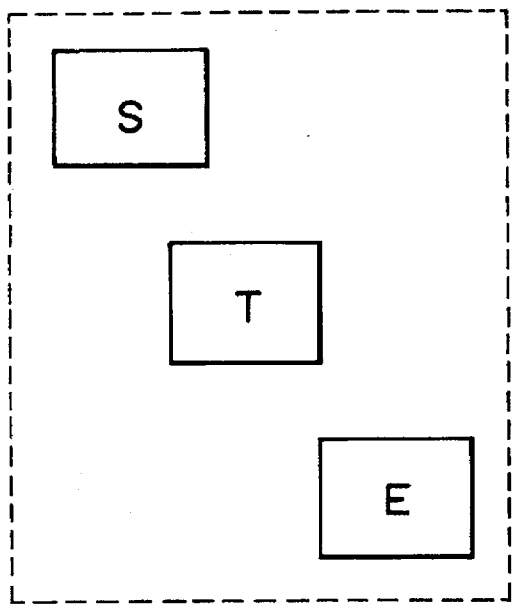
FIGS. 3(a)–3(c) is a diagram illustrating the method for drawing a line between nodes.
Figure 3B:
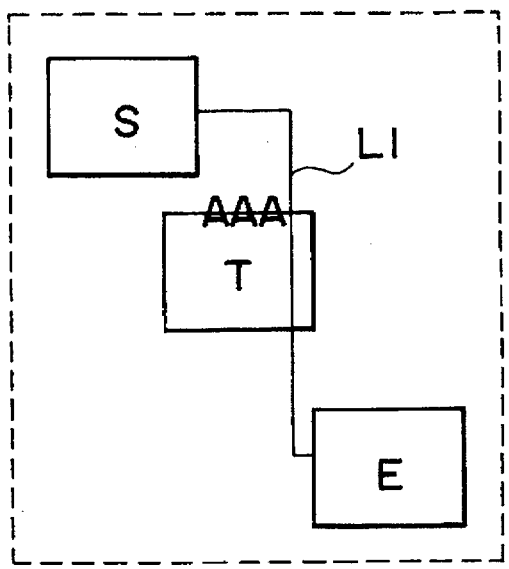

FIG. 3 is a diagram illustrating the method of drawing a line between nodes. FIG. 3(a) has a node S, a node T and a node E, and is shown at a time prior to connecting these nodes with lines. FIG. 3(b) is an example in which node S and node E have been joined by a line divided into vertical lines and horizontal lines using a conventional method, where AAA indicates line additional information.

In FIG. 3(b) node T lies between node S and node E, and thus node T and the line L1 overlap. Moreover, the additional information AAA and the T also overlap, and as a result the diagram is unclear. In order to overcome the overlapping in this case, it is necessary either to alter the start point, the end point or the vertex of polyline, or to move the node T into a position in which it does not overlap, a difficult task where a large number of nodes and lines are involved.

Figure 3C:
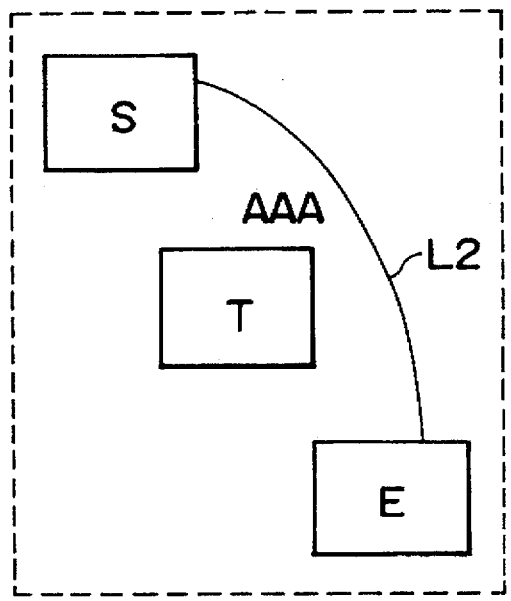
Figure 6A:
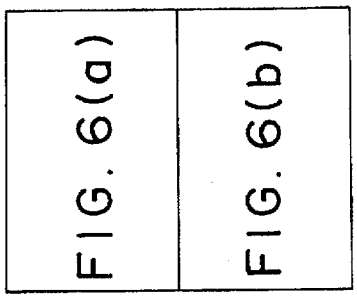
FIGS. 6(a)–6(b) is a flow chart showing the operation of the network diagram generation part.
Figure 6A:
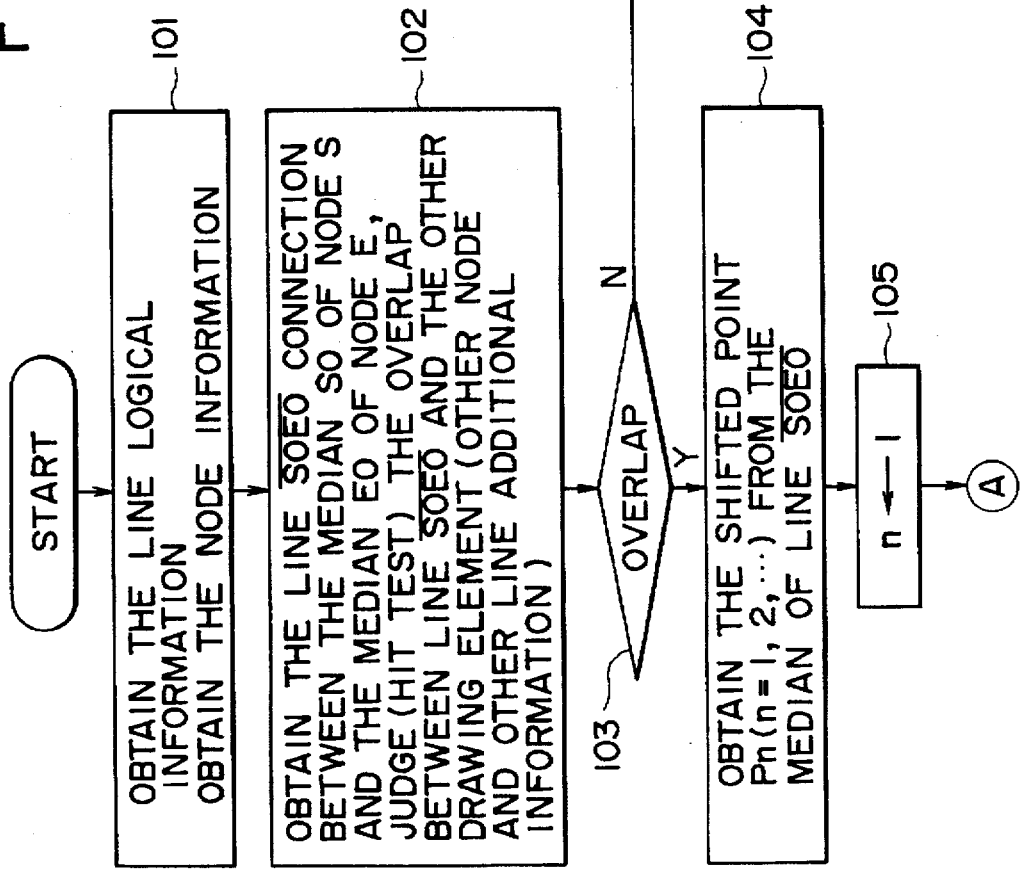
Figure 6B:
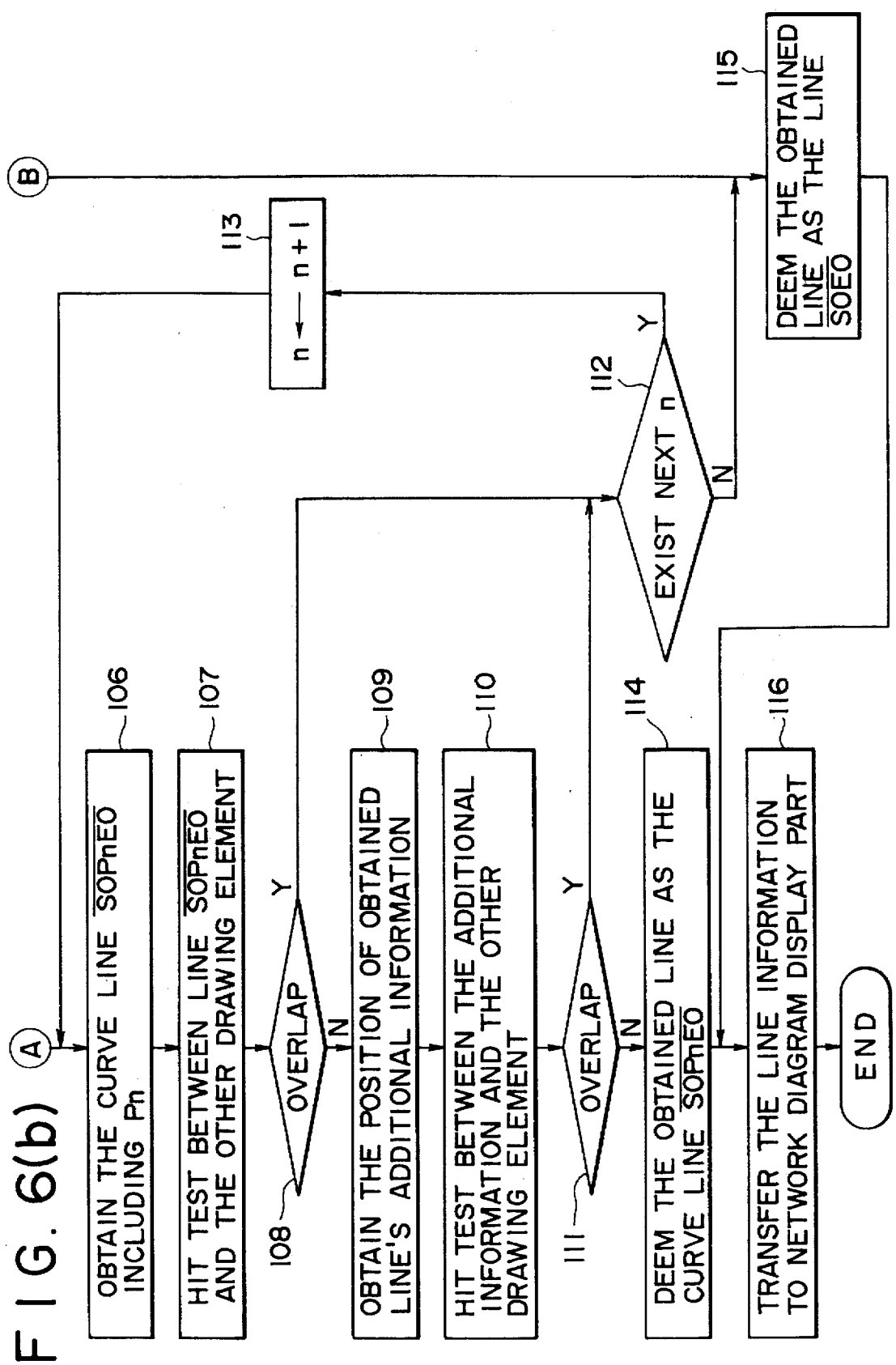

FIG. 3(c) is an example in which the node S and the node E are joined by a curved line L2 using the method of the present invention. Line L2 is drawn such that it does not overlap with node T, and also such that the additional information AAA of the line L2 does not overlap the node T.

The operation processing of this system is described below in conjunction with FIGS. 1 and 2.

First, the recognition parts of the input data processing part 21, namely the character recognition part 10, the diagram recognition part 11, and the gesture recognition part 12 judge whether the information input from the input device 1 is character information, a diagram or a gesture command, and it is recognized as one of these. Herein "gesture command" means a command for instructing an edit of characters or graphics, such as "v", "x".

In FIG. 3(a), the input information is only diagrams, and it is thus recognized as diagrams and displayed. Two of the displayed diagrams are deemed to be nodes. When a line is to be drawn between the two nodes S and E, a line is drawn between the two nodes S and E using the input device 1.

At the input data processing part 21, flow changes to node information operation or line logic information operation.

When the node S and the node E are joined by a line, information comprising the information "node S and node E are connected" and the information "the additional information is AAA" is transferred to the logical information operation part 22.

The logical information operation part 22 alters the logical information in the line logical information storage part 24 based on these items of information. The altered information is transferred to the network diagram generation part 25, and is displayed on the display device 3 by means of the network diagram display part 26.

FIG. 4 is an example of node information. The top left coordinates and the bottom right coordinates of the node are stored as the node specification method, and from these the position of the node and its size are known. Its center point can also be calculated.

FIG. 5 is an example of line logic information (connection information), showing the details of the line logic information after a line has been added between node S and node E. The information table of FIG. 5 is empty before the addition of the line.

The details of the processes of the network diagram generation part 25 are described using the flow charts of FIG. 6 and FIG. 7 through FIG. 9.

The line logical information and node information all obtained at Step 101.

First, the line logical information is obtained from the line logical information storage part 24. The line logical information is as shown in FIG. 5. Since the nodes between which a line is to be drawn are S and E, the position information for node S and node E is obtained from the node information storage part 23.

Figure 7A:
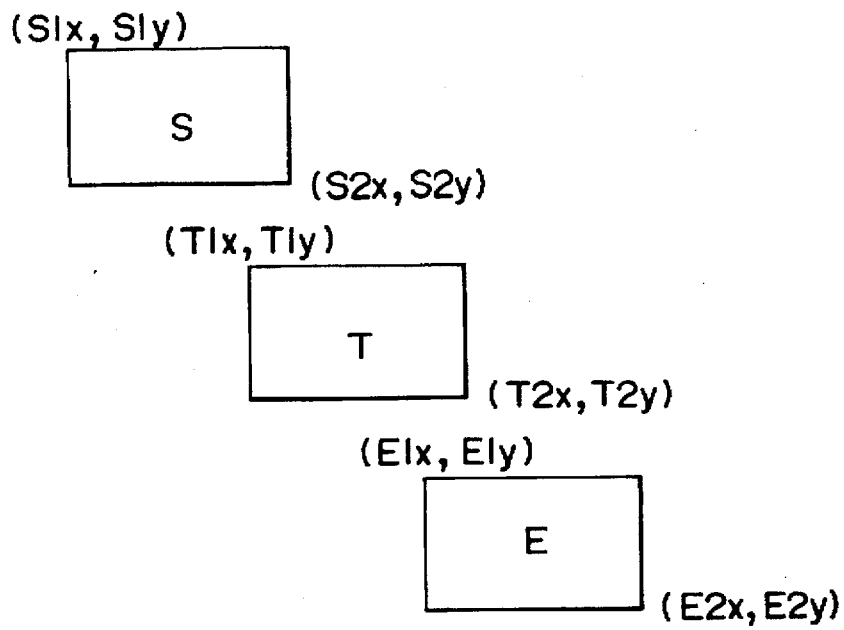
FIGS. 7(a)–7(b) is a diagram illustrating the operation in which a line avoids a node.

The node information is as shown in FIG. 4, and the position of the nodes is as shown in FIG. 7(a).

The hit test between the straight line and other nodes is performed at Step 102.

It is judged whether, when the most simple connection is made, using a straight line, it overlaps other drawing elements (other nodes and the additional information of other lines). The judgment of this overlapping is referred to as a hit test hereinafter.

Other lines are not included as objects in the hit test, and the intersection of lines is permitted. Also, when nodes are joined by a line, there is a question as to where to put the connection point. There are several methods, including, for example, a method in which the line is connected between the centers of the nodes and the point at which this line crosses the node is found and used as the coordinates during drawing, or a method in which the centers are joined by a line and the nodes are drawn overlapping the lines during drawing so that the connection is visible. The present embodiment shows a hit test using a method in which the centers of the nodes to be connected are connected.

Obtaining the equation for the straight line between the center SO of node S and the center EO of the node E will now be described.

The coordinates of SO and EO are obtained from the following equations:

$$SO_x=(S1_x+S2_x)/2,\ SO_y=(S1_y+S2_y)/2 \qquad (1)$$

$$EO_x=(E1_x+E2_x)/2,\ EO_y=(E1_y+E2_y)/2 \qquad (2)$$

If we let the straight line SO EO be y=f(x), then:

$$y=f(X)=(EO_y-SO_y)/(EO_x-SO_x)\times(x-SO_x)+SO_y \qquad (3)$$

Figure 7B:
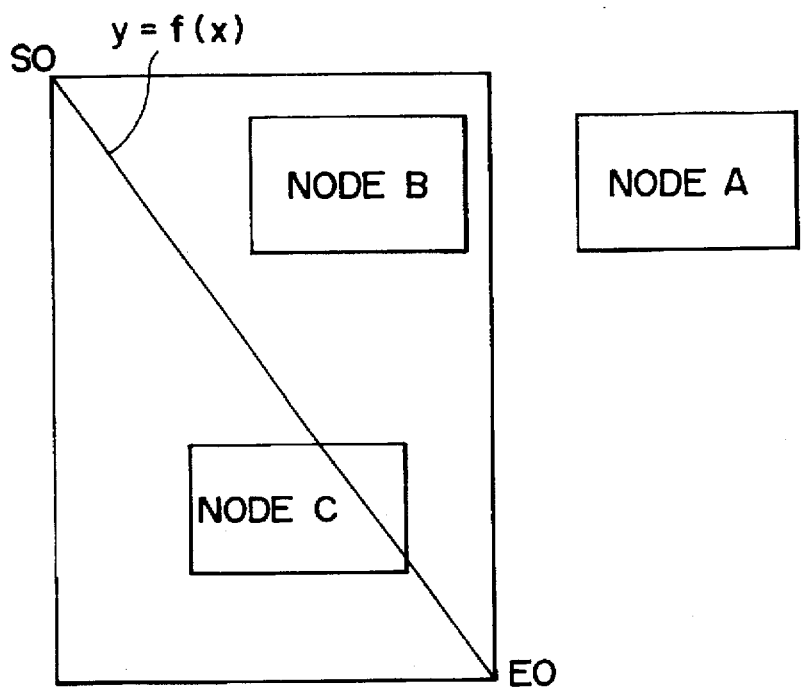

Hit test with other nodes for y=f(x) will now be described using FIG. 7(b).

First, an investigation is carried out to determine whether the four points (top left, bottom left, top right, bottom right) indicating the size of the node under investigation are contained within the region of the rectangle in which the two points SO and EO are at opposite corners. If none of the four points are included in the rectangle then it does not overlap the straight line SO EO. Node A in FIG. 7(b) corresponds to this case. If even one of the four points is included in this rectangle, then the following judgment is made.

The coordinates of each of the four points are substituted in turn into y–f(x). If the respective values are M1 to M4, and if all of M1 to M4 are greater than 0 or less than 0, then the node does not overlap y=f(x) indicating the straight line SO EO. Node B in FIG. 7(b) corresponds with this case. If one or more of M1 to M4 are equal to 0, or if there are values which are greater than 0 and values which are less than 0, then the node and the straight line SO EO overlap. Node C in FIG. 7(b) corresponds with this case.

The hit test result judgment is performed at Step 103.

If it is judged by means of the hit test that none of the nodes overlap, then the straight line SO EO is the obtained line (step 115). If there is an overlap, then processing is performed to obtain a line which avoids overlapping the node.

The process of obtaining a curved line which does not overlap a node will now be discussed.

Figure 8A:
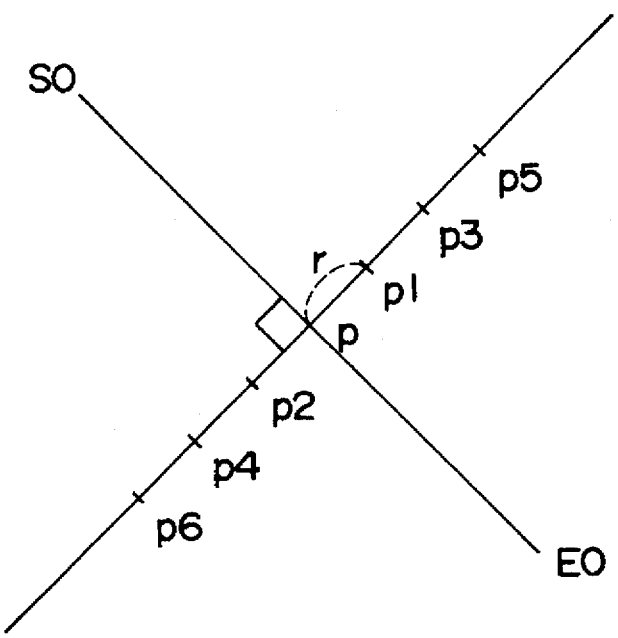
FIG. 8 including FIGS. 8(a–8(b) is a diagram illustrating the operation in which a line avoids a node.
Figure 8B:
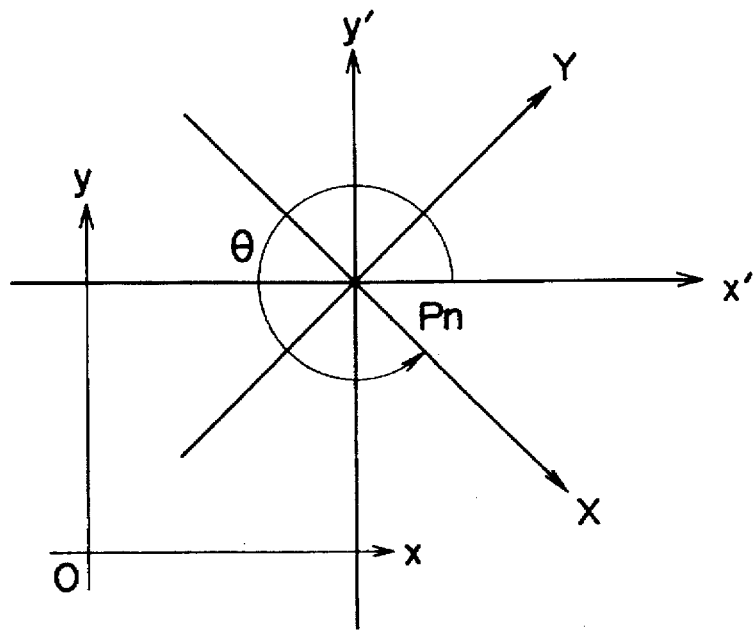

The step of obtaining the shifted point Pn from the mid point of the straight line SO EO (step 104) is described in conjunction with FIG. 8(a).

First, taking the mid point of the straight line connecting node S and node E as P, we have:

$$P_x=(SO_x+EO_x)/2, P_y=(SO_y+EO_y)/2 \tag{4}$$

This P is shifted with respect to the straight line SO EO, and a point through which a curve passes is found, but there are many methods for carrying out this shifting. In order to obtain the most simple and elegant curve, the present embodiment looks on both sides of the straight line SO EO along a line perpendicular to the straight line SO EO (See FIG. 8(a)). Also, the shifting distance is given fixed values r, –r, 2r, –2r, . . .

The coordinates of the point P1 separated by a distance r along the line perpendicular to the straight line SO EO are given by:

$$P1_x=P_x+r\times(SO_y-EO_y)/SQRT((SO_x-EO_x)^2+(SO_y-EO_y)^2) \tag{5}$$

$$P1_y=P_x+r\times(SO_x-EO_x)/SQRT((SO_x-EO_x)^2+(SO_y-EO_y)^2) \tag{6}$$

Hereafter, P2, P3, . . . , are obtained in the same way by putting –r, 2r, . . . , as r in the above equation. Note that SQRT means that the square root should be obtained.

The step of obtaining the quadratic curve passing through Pn, SO and EO will now be described (Step 106).

Now, consider an X–Y coordinate system in which Pn is the origin, the X direction is the direction parallel to the straight line SO EO, and the Y-direction is the direction of PEO rotated anticlockwise through 90°.

In the X–Y coordinate system, quadratic curves passing through SO and EO, with Pn as the apex, are given by:

$$Y=g(X)=aX^2. \tag{7}$$

The value of a herein is found by substituting the values of SO using an X–Y coordinate system into the above equation:

$$a=-4\times r/((SO_x-EO_x)^2+(SO_y-EO_y)^2). \tag{8}$$

The hit test for the curved line SPnE and other nodes will now be described.

Since the positions of other nodes are given in the x–y coordinate system, these are converted into the X–Y coordinate system. This is described below in connection with FIG. 8(b).

For example, the position in the x–y coordinate system of the top left point of node T in FIG. 7(a) is given by $T1_x$, $T1_y$. Now, consider a coordinate system $x^1-y^1$ in which the origin of the x–y coordinate system is moved to Pn. The position of node T in the $x^1-y^1$ coordinate system is $T1_x-Pn_y$. Let this point be $T1^1$ ($T1_x^1$, $T1_y^1$).

If the angle between the $x^1-y^1$ coordinate system and the X–Y coordinate system is θ, and the position of $T1^1$ in the X–Y coordinate system is TT1 ($TT1_x$, $TT1_y$), then $$TT1_x=T1_x^1 \cos θ + T1_y^1 \sin θ \tag{9}$$

$$TT1_y=T1_x^1 \sin θ + T1_y^1 \cos θ \tag{10}$$

Wherein:

$$\sin θ=(EO_y-SO_y)/SQRT((SO_x-EO_x)^2+(SO_y-EO_y)^2) \tag{11}$$

$$\cos θ=(EO_x-SO_x)/SQRT((SO_x-EO_x)^2+(SO_y-EO_y)^2). \tag{12}$$

Therefore, the coordinates of TT1 are obtained by substituting these SIN θ and COS θ into the corresponding equations 9 and 10. Thereafter, the positions of the other three points in the X–Y coordinate system are found in the same way.

Having obtained the positions in the X–Y coordinate system of the four points indicating the size of the node, the following hit test is performed (step 107).

First, let the coordinates of the points SO and EO, when converted to the X–Y coordinate system with Pn as the origin, be SSO($SSO_x$, $SSO_y$) and EEO($EEO_x$, $EEO_y$). The method of conversion is the same as the abovementioned conversion.

Figure 9A:
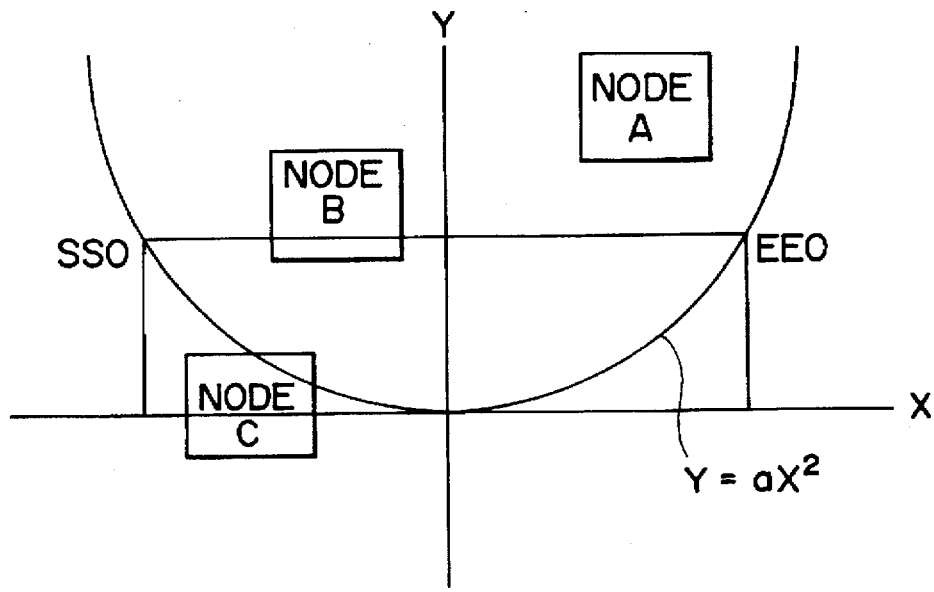
FIGS. 9(a)–9(b) is a diagram illustrating the operation in which a line avoids a node.

In the X–Y coordinate system, the rectangle inscribed by the curve SO PnEo is a rectangle in which the two points ($SSO_x$, 0) and ($EEO_x$, $EEO_y$) are in opposite corners, as shown in FIG. 9(a). Having found this rectangle, subsequent process is the same as in the hit test for the straight line, and can be achieved by replacing the equation y=f(x) for the straight line with the equation Y=g(X) for the curved line.

In other words, judgment is made as to whether the four points of another node are included within the obtained rectangle, and if there are included points then the four points are substituted into Y=g(X), and if all of the values are greater than 0 or all of the values are less than 0 then there is judged to be no hit.

Figure 9B:
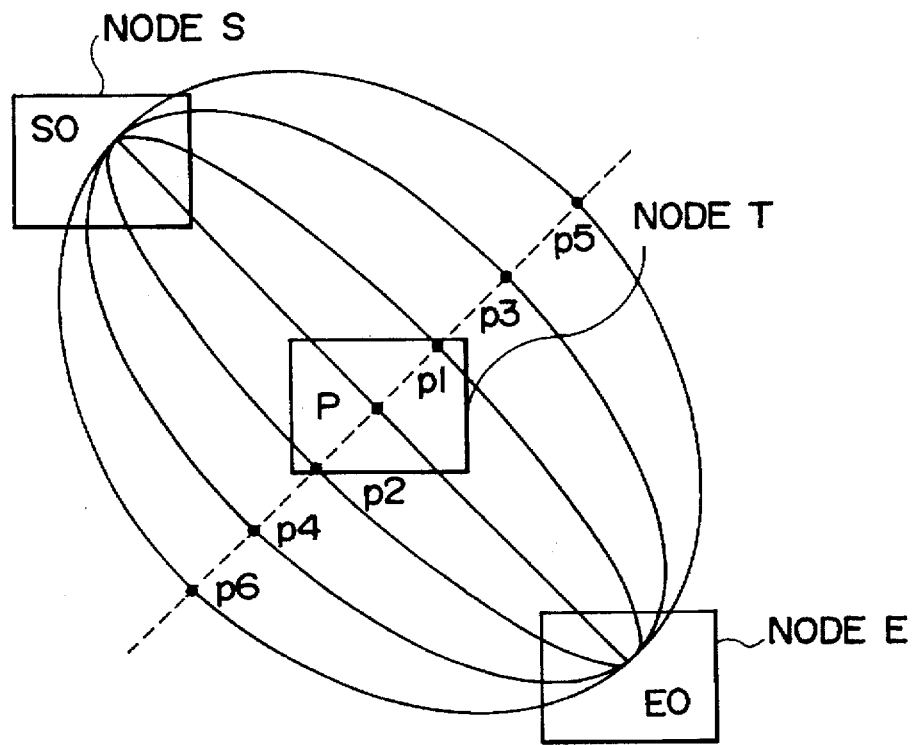

The above process (Step 106 to 107) is performed from n=1 (Step 105), overlapping is judged (Step 108), and when there is an overlap then a judgment is made as to whether the next n exists (Step 112). If the next n does exist then the process is repeated with N=n+1 (Step 113). In the example of FIG. 9(b), P1 and P2 overlap with node T, and at the point P3 a point which does not overlap is obtained.

Also, there is a limit to n, and the limit depends on the range permitted from drawing within the network diagram. If n exceeds the limit then, in the present embodiment, removal of the overlap is halted and the initially obtained straight line id drawn (Step 115). However, processing can be continued to remove the overlap depending on the purpose of the network diagram.

For example, without connecting node S and node E with a straight line, it is also possible to use the hit test to obtain a point which does not overlap other drawing elements, and calling this point Q, curved lines may then be obtained between S and Q, and between E and Q, with which there are no overlaps. Moreover, Q can be increased in number to Q1, Q2, for example. However, if processing speed is required in the interactive processing or ease of understanding of the diagram is required, it is more practical to stop at a simple stage, as in the process in FIG. 6.

The step of obtaining the position of line additional information will now be described (Step 109).

Considering a sequence of characters as the line additional information, the space taken up by the sequence of characters can be found since the size of the characters is decided in advance by means of the drawing system.

For example, if the size of the drawing characters is 12 point, and the sequence of characters is "AAA", then the size of the body of the sequence of characters is determined. Its position is determined according to the position of the line. For example, the bottom left position of the sequence of characters can be aligned with the mid point position of the line, or the center of the sequence of characters can be aligned with the mid point of the line, or the like, and this is determined by the application of the network diagram.

Having obtained the position of the line, a hit test between the line and other drawing elements is performed (Step 110). The phrase "other drawing elements" refers to other nodes or other line additional information. Considering the rectangles occupying the respective sizes of the line additional information and the nodes, an overlapping test for rectangles can be easily obtained by effecting a judgment comparing the four verticals.

An overlap judgment is made at Step 111. When additional information overlaps other drawing elements, in this embodiment the direction in which the line is drawn is changed (step 112 through 113). However, depending on the application of the network diagram, it also possible to shift only the additional information into a position in which it does not overlap, by making the relationship between the position of the line and the position of the additional information variable.

The obtained line is defined at Step 114. Having defined the obtained line using the above process, the line information for drawing is obtained.

If the line is a straight line, it can be drawn as it is, but when it is a curved line, since it is given as an equation in the X–Y coordinate system, it must be converted into the x–y coordinate system. This can be obtained by performing the coordinate conversion shown in the above mentioned step with respect to the following equation $$Y = aX^2 \tag{13}$$

In other words the result is obtained by substituting, for X and Y in the above equation, $$X = x^1 \cos\theta + y^1 \sin\theta \tag{14}$$

$$Y = -x^1 \sin\theta + y^1 \cos\theta \tag{15}$$

$$\sin\theta = (EO_y - SO_y)/SQRT((SO_x - EO_x)^2 + (SO_x - EO_y)^2) \tag{16}$$

$$\cos\theta = (EO_x - SO_x)/SQRT((SO_x - EO_x)^2 + (SO_x - EO_y)^2) \tag{17}$$

and substituting $$x_1 = x + Pn_x \tag{18}$$

$$y_1 = y + Pn_y. \tag{19}$$

Also, when performing this drawing, it is also possible to draw without using this quadratic curve equation by using a different similar curve. For example, it can also be drawn by obtaining spleins which pass through the points SO, Pn and EO. A method for obtaining splines is disclosed in "Shape-Processing Engineering by means of a Computer Display (2)" (Japanese), by Fujio Yamaguchi, Nikkan Kogyosha, P84 to p87. This method for obtaining splines is advantageous since it has been widely provided by graphic libraries in recent years form computer drawing processing.

Having obtained the information for the line to be drawn, this information is transferred to the network drawing display part 26 (step 116).

Figure 10:
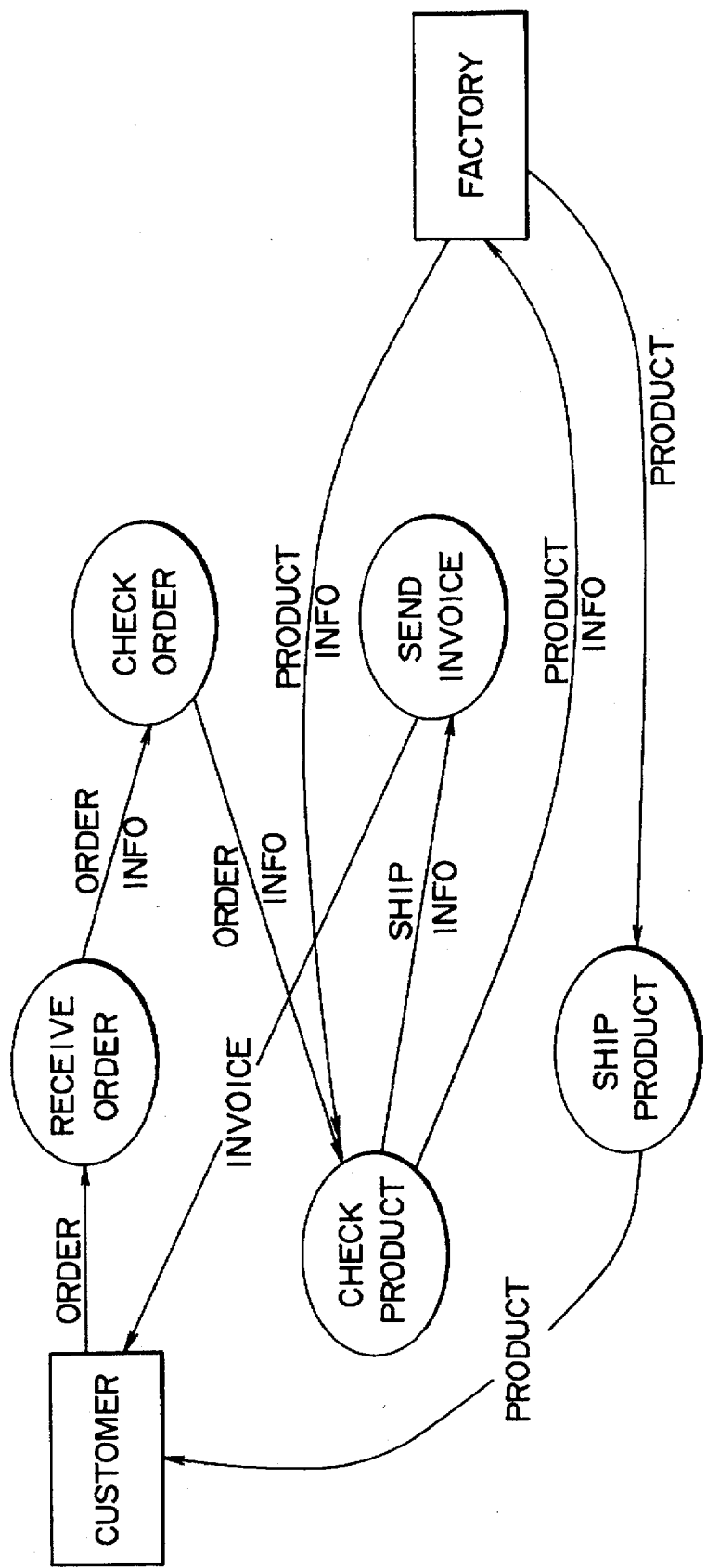
FIG. 10 is a specific example applied to the drawing of a data flow diagram.

An application of the present invention is shown in FIG. 10. FIG. 10 shows a data flow diagram, as widely used in system development and system analysis, in which ellipses, rectangles and parallel lines correspond to nodes, and the lines with arrowheads drawn between the nodes, are called data flow, and are drawn avoiding the nodes. Sequences of characters are drawn as the line additional information, and they are displayed in the position such that the mid point of the line and the mid point of the sequence of characters overlap. This is in accordance with the characteristic of data flow diagrams and are more readily understandable if the correspondence between the line and the sequence of characters, which is the additional information, is made clear by overlapping them.

It will be seen that according to the present invention it is possible to obtain natural and easily understandable diagrams such as would be printed in a data flow diagram text book, without performing troublesome coordinate specification when drawing the flow.

As explained above, according to the present invention it is possible, in drawing a network diagram, to obtain natural and easily understandable diagrams which take account of removing the overlapping of nodes, simply by specifying logically the nodes between which lines are to be drawn. As a result, since irritating specifications are unnecessary and easily understandable diagrams can be obtained, network diagram production work is performed without an interruption in the train of thought of the operator, and the work is improved greatly.

What is claimed is:

1. A method for drawing network diagrams having nodes and lines, comprising the steps of:
   (a) establishing a first candidate line connecting nodes which are to be connected, based on node information such as position information of nodes within a network diagram, and connection information indicating which nodes are connecting by node-connecting lines;
   (b) provisionally connecting the nodes which are to be connected by means of the first candidate line;
   (c) judging whether or not the provisionally connected first candidate line overlaps other nodes, the other nodes being nodes which are not to be connected;
   (d) setting up a second candidate line when there is an overlap, and repeating the above-identified steps until an ultimately selected candidate line does not overlap other nodes; and
   (e) fixing the ultimately selected candidate line as the line connecting the nodes which are to be connected.

2. A method for drawing network diagrams according to claim 1, further comprising the steps of:
   holding additional information such as text data together with the connection information; and
   placing the additional information in a vicinity of the ultimately selected candidate line.

3. A system for drawing network diagrams having nodes and lines, comprising:

(a) node information storage means for storing node information such as position information of nodes within a network diagram;

(b) line logical information storage means for holding connection information indicating which nodes are to be connected by lines which connect nodes; and (c) network diagram generation means for generating a network diagram from the node information and the connection information;

wherein the network diagram generation means includes:

set-up means for setting up a first candidate line connection nodes which are to be connected based on the node information and the connection information;

connection means for provisionally connecting the nodes which are to be connected, by means of the first candidate line;

judgmnent means for judging whether or not the provisionally connected first candidate line overlaps other nodes other nodes, the other nodes being nodes which are not to be connected;

detection means for setting up a second candidate line when there is an overlap, wherein the detection means repeatedly sets up new candidate lines until an ultimately selected candidate line does not overlap other nodes; and fixing means for fixing the ultimately selected candidate line as the line connecting the nodes which are to be connected.

4. A system for drawing network diagram according to claim 3, wherein additional information such as text data is stored in the line logical information storage means, together with the connection information, and the additional information is placed in a vicinity of the ultimately selected candidate line.

5. A system for drawing network diagrams having nodes and lines, comprising:

(a) input data processing means for analyzing input data, and converting it to line logical information and node information having node coordinates and properties, connection information indicating which nodes are to be connected, or additional information such as text data;

(b) logical information operation means for performing operations on the node information and the connection information;

(c) node information storage means for holding the node information;

(d) line logical information storage means holding the connection information and line logical information;

(e) set-up means for setting up a first candidate line connecting nodes which are to be connected, based on the node information and the connection information;

(f) connection means for provisionally connecting the nodes which are to be connected, by means of the first candidate line;

(g) judgment means for judging whether or not the provisionally connected first candidate line overlaps other nodes, the other nodes being nodes which are not to be connected;

(h) detection means for setting up a second candidate line when there is an overlap, wherein the detection means repeatedly sets up new candidate lines until an ultimately selected candidate line does not overlap other nodes;

(i) fixing means for fixing the ultimately selected candidate line as the line connecting the nodes which are to be connected; and (j) a display means for displaying the nodes and the fixed lines.

6. A system for drawing network diagrams according to claim 5, wherein the input data processing means includes a recognition means for recognizing what type of information the input information is.

7. A system for drawing network diagrams according to claim 6, wherein the recognition means recognizes whether the input information is character information, diagrams or gestures.

8. A system for drawing network diagrams according to claim 5, wherein the input data processing means includes:

character recognition means for recognizing that the input information is in the form of characters;

diagram recognition means for recognizing that the input information is in the form of diagrams; and gesture recognition means for recognizing that the input information is in the form of gestures.

9. A system for drawing network diagrams according to claim 5, wherein the logical information operation means alters the logical information of the line logical information storage means, based on the node information and the line logical information.

10. A system for drawing network diagrams according to claim 5, wherein additional information such as text data is stored in the line logical information storage means, together with the connection information, and the additional information is placed in a vicinity of the line by the fixing means.

* * * * *